United States Patent
Griffin et al.

(10) Patent No.: US 8,291,497 B1
(45) Date of Patent: Oct. 16, 2012

(54) SYSTEMS AND METHODS FOR BYTE-LEVEL CONTEXT DIVERSITY-BASED AUTOMATIC MALWARE SIGNATURE GENERATION

(75) Inventors: Kent Griffin, Los Angeles, CA (US); Tzi-cker Chiueh, Setauket, NY (US); Scott Schneider, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 706 days.

(21) Appl. No.: 12/408,306

(22) Filed: Mar. 20, 2009

(51) Int. Cl.
  *G06F 11/00* (2006.01)
  *G06F 12/14* (2006.01)
  *G06F 12/16* (2006.01)
  *G06F 11/30* (2006.01)
  *G06F 15/173* (2006.01)
  *G08B 23/00* (2006.01)

(52) U.S. Cl. ............. 726/23; 726/25; 713/188; 709/224

(58) Field of Classification Search ...................... 726/23
See application file for complete search history.

(56) References Cited

U.S. PATENT DOCUMENTS

| | | | | |
|---|---|---|---|---|
| 5,440,723 | A * | 8/1995 | Arnold et al. | 714/2 |
| 5,452,442 | A * | 9/1995 | Kephart | 714/38.1 |
| 5,485,575 | A * | 1/1996 | Chess et al. | 714/38.13 |
| 6,016,546 | A * | 1/2000 | Kephart et al. | 726/24 |
| 6,282,698 | B1 * | 8/2001 | Baker et al. | 717/118 |
| 6,357,008 | B1 * | 3/2002 | Nachenberg | 726/24 |
| 6,810,398 | B2 * | 10/2004 | Moulton | 1/1 |
| 7,107,617 | B2 * | 9/2006 | Hursey et al. | 726/22 |
| 7,134,143 | B2 * | 11/2006 | Stellenberg et al. | 726/25 |
| 7,272,602 | B2 * | 9/2007 | Moulton | 1/1 |
| 7,284,273 | B1 * | 10/2007 | Szor | 726/24 |
| 7,290,282 | B1 * | 10/2007 | Renert et al. | 726/24 |
| 7,313,555 | B2 * | 12/2007 | Klier | 1/1 |
| 7,376,842 | B1 * | 5/2008 | Hursey | 713/188 |
| 7,392,543 | B2 * | 6/2008 | Szor | 726/23 |
| 7,418,729 | B2 | 8/2008 | Szor et al. | |
| 7,487,544 | B2 * | 2/2009 | Schultz et al. | 726/24 |
| 7,493,658 | B2 * | 2/2009 | Shipp | 726/24 |
| 7,496,963 | B2 * | 2/2009 | Shipp | 726/24 |
| 7,526,804 | B2 * | 4/2009 | Shelest et al. | 726/22 |
| 7,620,991 | B2 * | 11/2009 | Taneja et al. | 726/24 |
| 7,640,589 | B1 * | 12/2009 | Mashevsky et al. | 726/24 |
| 7,647,636 | B2 * | 1/2010 | Polyakov et al. | 726/24 |
| 7,664,754 | B2 * | 2/2010 | Shipp | 726/24 |
| 7,694,150 | B1 * | 4/2010 | Kirby | 713/188 |
| 7,707,634 | B2 * | 4/2010 | Sandu et al. | 726/24 |

(Continued)

OTHER PUBLICATIONS

Tian, Ronghua, Lynn Batten & Rafiqul Islam, an Automated Classification System Based on the Strings of Trojan and Virus Families, 2009 4th International Conference on Malicious and Unwanted Software (Malware), 2009.*

(Continued)

*Primary Examiner* — Carolyn B Kosowski
(74) *Attorney, Agent, or Firm* — Advantedge Law Group

(57) ABSTRACT

A computer-implemented method for facilitating automatic malware signature generation may comprise providing a byte sequence marked for possible inclusion within one or more malware signatures, determining a context diversity of the byte sequence within malware files each containing the byte sequence in accordance with a diversity-based heuristic, and preventing the byte sequence from being included within the one or more malware signatures in accordance with the determined context diversity. Corresponding systems and computer-readable storage media are also disclosed.

20 Claims, 9 Drawing Sheets

U.S. PATENT DOCUMENTS

| | | | | |
|---|---|---|---|---|
| 7,895,655 | B2* | 2/2011 | Saito | 726/24 |
| 7,925,888 | B1* | 4/2011 | Nachenberg | 713/188 |
| 7,979,907 | B2* | 7/2011 | Schultz et al. | 726/24 |
| 8,108,931 | B1* | 1/2012 | Witten et al. | 726/23 |
| 2006/0026675 | A1* | 2/2006 | Cai et al. | 726/22 |
| 2006/0107321 | A1* | 5/2006 | Tzadikario | 726/22 |
| 2006/0130046 | A1* | 6/2006 | O'Neill | 717/168 |
| 2007/0038637 | A1* | 2/2007 | Taneja et al. | 707/10 |
| 2007/0143847 | A1* | 6/2007 | Kraemer et al. | 726/23 |
| 2007/0152854 | A1* | 7/2007 | Copley | 341/51 |
| 2007/0180528 | A1* | 8/2007 | Kane | 726/24 |
| 2007/0240217 | A1* | 10/2007 | Tuvell et al. | 726/24 |
| 2007/0240218 | A1* | 10/2007 | Tuvell et al. | 726/24 |
| 2007/0240219 | A1* | 10/2007 | Tuvell et al. | 726/24 |
| 2007/0240220 | A1* | 10/2007 | Tuvell et al. | 726/24 |
| 2007/0240221 | A1* | 10/2007 | Tuvell et al. | 726/24 |
| 2007/0240222 | A1* | 10/2007 | Tuvell et al. | 726/24 |
| 2008/0127336 | A1* | 5/2008 | Sun et al. | 726/22 |
| 2008/0172739 | A1* | 7/2008 | Nakae et al. | 726/22 |
| 2008/0263669 | A1* | 10/2008 | Alme | 726/24 |
| 2008/0282349 | A1* | 11/2008 | Koui et al. | 726/24 |
| 2009/0013405 | A1* | 1/2009 | Schipka | 726/22 |
| 2009/0070459 | A1* | 3/2009 | Cho et al. | 709/224 |
| 2009/0235357 | A1* | 9/2009 | Ebringer et al. | 726/24 |
| 2009/0293114 | A1* | 11/2009 | Mustafa | 726/13 |
| 2010/0333203 | A1* | 12/2010 | Tsviatkou et al. | 726/23 |
| 2011/0202998 | A1* | 8/2011 | Dullien | 726/24 |

OTHER PUBLICATIONS

Griffin, Kent, Scott Schneider, Xin Hu & Tzi-cker Chiueh, Automatic Generation of String Signatures for Malware Detection, RAID 2009, pp. 101-120, 2009.*

Kephart, Jeffrey et al.; "Automatic Extraction of Computer Virus Signatures"; In Proceedings of the 4th Virus Bulletin International Conference, R. Ford, ed., Virus Bulletin Ltd.; 1994; pp. 178-184; Abingdon, England; http://www.research.ibm.com/antivirus/SciPapaers/Kephart/VB94/vb94.html.

Guilfanov, Ilfak et al.; "Hex-Rays : Interactive Disassembler Pro—FLIRT Technology"; (accessed May 15, 2009); http://www.hex-rays.com/idapro/flirt.html.

Lee, Seoung-Won et al.; "Enhanced Hot Spot Detection Heuristics for Embedded Java Just-in-Time Compilers"; Proceedings of the 2008 ACM SIGPLAN-SIGBED; (accessed May 15, 2009); pp. 13-22; ACM; NYC, NY, USA; http://portal.acm.org/citation.cfm?id=1375657.1375660&coll=ACM&dl=ACM.

Lee, Seoung-Won et al.; "Enhanced Hot Spot Detection Heuristics for Embedded Java Just-in-Time Compilers"; ACM SIGPLAN Notices; Jul. 2008; V.43-Issue 7; ACM; NYC, NY, USA; http://portal.acm.org/citation.cfm?id=1379023.1375660&coll=&dl=ACM.

"Heuristic analysis"; (accessed May 15, 2009); Wikipdedia; http://en.wikipedia.org/wiki/Heuristic_analysis.

Pierce, Cody; "MindshaRE: The IDA Pro Book"; Aug. 28, 2008; http://dvlabs.tippingpoint.com/blog/2008/08/28/mindshare-the-ida-pro-book.

"IDA Pro Disassembler and Debugger"; Mar. 22, 2008; http://www.h33t.com/details.php?id=ffcf99fcaf96e60e4d296c973fcd4b255b09aff7.

"Some Projects Require Space and Time . . . IDA Pro 4.30 Saves Time . . . Gives Space"; (accessed May 18, 2009); http://www.datarescue.be/idafreeware/430brochure.pdf.

* cited by examiner

SYSTEMS AND METHODS FOR BYTE-LEVEL CONTEXT DIVERSITY-BASED AUTOMATIC MALWARE SIGNATURE GENERATION

BACKGROUND

Consumers and businesses increasingly rely on computers to store sensitive data. Consequently, malicious programmers seem to continually increase their efforts to gain illegitimate control and access to others' computers. Computer programmers with malicious motivations have created and have continued to create viruses, Trojan horses, worms, and other programs meant to compromise computer systems and data belonging to other people. These malicious programs are often referred to as malware.

Security software companies are combating the growing tide of malware by creating and deploying malware signatures (e.g., sequences of bytes that identify malware) to their customers on a regular basis. By frequently updating malware signatures, security software companies may help their customers secure their computers against new and changing threats.

Given the rapidly increasing number of malicious programs that are being developed, there exists a strong motivation for automatically generating malware signatures that each cover multiple malware files. A technical challenge associated with such automatic malware signature generation is ensuring that the malware signatures do not result in false positives when used to identify or detect malware. In other words, it is desirable to minimize the number of goodware programs that are incorrectly identified as malware using automatically generated malware signatures.

SUMMARY

As will be described in greater detail below, the instant disclosure generally relates to systems and methods for facilitating automatic malware signature generation by determining a context diversity of a byte sequence marked for possible inclusion within one or more malware signatures. If the context diversity of the marked byte sequence is too diverse, the marked byte sequence is likely to be representative of code commonly used by both malware and goodware. Hence, the systems and methods described herein may prevent such byte sequences from being included within one or more automatically generated malware signatures. In this manner, the number of goodware programs that are incorrectly identified as malware using the automatically generated malware signatures is minimized.

In some embodiments, a computer-implemented method for facilitating automatic malware signature generation may comprise: 1) providing a byte sequence marked for possible inclusion within one or more malware signatures, 2) determining a context diversity of the byte sequence within malware files each containing the byte sequence in accordance with a diversity-based heuristic, and 3) preventing the byte sequence from being included within the one or more malware signatures in accordance with the determined context diversity.

Exemplary diversity-based heuristics that may be used to determine a context diversity of a marked byte sequence within containing malware files include grouping a plurality of malware files into a plurality of malware family clusters and determining a total number of clusters that include at least one containing malware file, determining a byte offset of the marked byte sequence in each of the containing malware files, determining whether a second byte sequence associated with a malware signature is located within each of one or more of the containing malware files, and/or determining a total number of distinct byte sequences that surround the marked byte sequence in two or more of the containing malware files.

By proceeding in this manner, the exemplary systems and methods described herein may reduce the number of byte sequences representative of common code that are used to generate malware signatures, and thereby minimize the number of goodware programs incorrectly identified as comprising malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
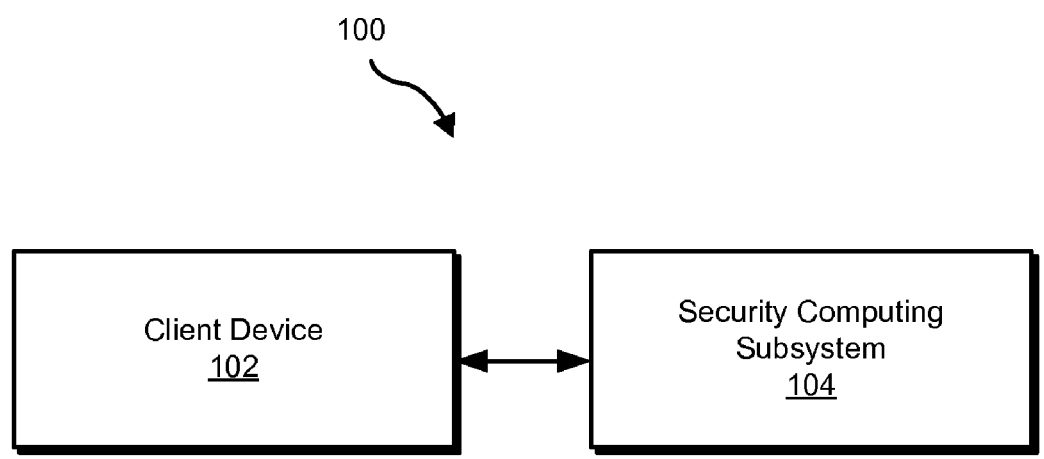
FIG. 1 is a block diagram of an exemplary system for identifying malware according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for facilitating automatic malware signature generation. As used herein, the term "malware signature" refers to a sequence of bytes used to identify malware.

The systems and methods described herein facilitate automatic signature generation by providing a byte sequence marked for possible inclusion within one or more malware signatures, determining a context diversity of the byte sequence within malware files each containing the byte sequence (referred to herein as "containing malware files") in accordance with a diversity-based heuristic, and preventing the byte sequence from being included within the one or more malware signatures in accordance with the determined context diversity. As used herein, a "context diversity" of a byte sequence refers to differences in where the byte sequence is located within containing malware files, differences in how the byte sequence is used within containing malware files, and/or any other property related to the context of the byte sequence within containing malware files.

In this manner, as will be described in more detail below, the systems and methods described herein may minimize the number of goodware files (e.g., files and/or programs that do not comprise malware) that are incorrectly identified as malware using automatically generated malware signatures. This is because many of the malware files in existence are known to be variants of a single "family" or type of malware. By identifying byte sequences with low context diversity (i.e., high similarity) in the malware files which contain them, it is more likely that byte sequences unique to a family of malware has been identified. Conversely, byte sequences that have high context diversity (i.e., low similarity) in the malware files containing them are more likely to be general to executable programs of all kinds and thus are more likely to be found in goodware.

FIG. 1 illustrates an exemplary system 100 for identifying malware. As shown in FIG. 1, system 100 may include a client device 102 and a security computing subsystem 104 configured to communicate with one another. As will be described in more detail below, security computing subsystem 104 may be configured to automatically generate malware signatures. The malware signatures may be utilized by security computing subsystem 104 and/or client device 102 to identify or detect malware residing on client device 102.

Client device 102 generally represents any type or form of computing device capable of reading computer-executable instructions. Examples of client device 102 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Security computing subsystem 104 generally represents any combination of hardware, software, and/or firmware configured to provide one or more data security features to client device 102. Such data security features may include, but are not limited to, automatic malware signature generation, identification and removal of malware residing on client device 102, and/or any other data security feature as may serve a particular application.

Client device 102 and security computing subsystem 104 may each include one or modules configured to perform one or more of the tasks described herein. In certain embodiments, one or more of the modules described herein may represent one or more software applications or programs that, when executed by a computing device, may cause the computing device to perform one or more tasks. For example, as will be described in greater detail below, one or more of the modules described herein may represent software modules stored and configured to run on one or more computing devices or subsystems, such as client device 102, security computing subsystem 104, computing system 810 in FIG. 8, and/or portions of exemplary network architecture 900 in FIG. 9. One or more of the modules described herein may also represent all or portions of one or more special-purpose computers configured to perform one or more tasks.

Client device 102 and security computing subsystem 104 may communicate using any communication platforms and technologies suitable for transporting data, including known communication technologies, devices, media, and protocols supportive of remote or local data communications. For example, as will be described in connection with FIG. 2, client device 102 and security computing subsystem 104 may communicate using a network. Additionally or alternatively, a computer-readable-storage medium (e.g., an optical disc, flash drive, etc.) may be used to transport data from security computing subsystem 104 to client device 102.

Figure 2:
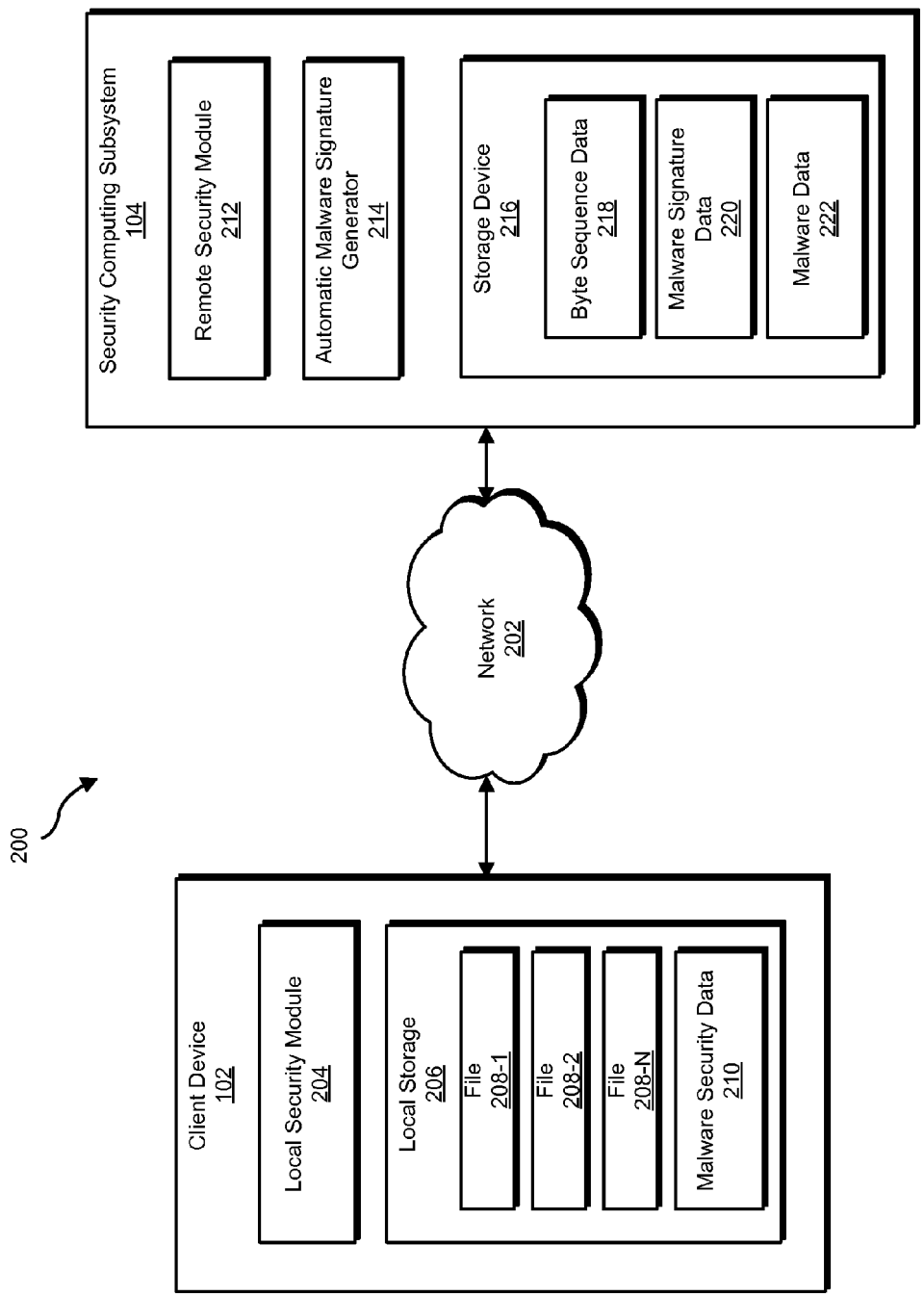
FIG. 2 is a block diagram of an exemplary implementation of the system of FIG. 1 according to one embodiment.

FIG. 2 shows an exemplary implementation 200 of system 100 wherein client device 102 and security computing subsystem 104 are communicatively coupled via a network 202. Network 202 generally represents any medium or architecture capable of facilitating communication or data transfer. Examples of network 202 include, without limitation, an intranet, a wide area network (WAN), a local area network (LAN), a personal area network (PAN), the Internet, power line communications (PLC), a cellular network (e.g., GSN network), exemplary network architecture 900 in FIG. 9, or the like. Network 202 may facilitate communication or data transfer using wireless or wired connections. In one embodiment, network 202 may facilitate communication between client device 102 and security computing subsystem 104.

As shown in FIG. 2, client device 102 may include a local security module 204 and a local storage 206. Local storage 206 generally represents any type or form of storage device, such as the storage devices illustrated and described in connection with FIGS. 8 and 9. Local storage 206 may be configured to store one or more files (e.g., files 208-1 through 208-N, collectively referred to herein as "files 208") and malware security data 210. Files 208 may include any type of file, such as, but not limited to, data files and executable files. In some instances, one or more of files 208 may undesirably comprise malware. Malware security data 210 may include any data used to identify and/or treat files comprising or otherwise associated with malware. For example, malware security data 210 may include one or more malware signatures generated by security computing subsystem 104 and/or any other data associated with malware security as may serve a particular application.

Local security module 204 may be configured to receive malware security data 210 from security computing subsystem 104. Local security module 204 may be further configured to identify malware residing on client device 102 by comparing one or more files (e.g., files 208) with one or more malware signatures provided by security computing subsystem 104. Local security module 204 may be further configured to remove, quarantine, and/or otherwise treat files comprising or otherwise associated with malware.

Security computing subsystem 104 may include, but is not limited to, a remote security module 212, an automatic malware signature generator 214, and a storage device 216.

Remote security module 212 may be configured to transmit malware security data 210 to local security module 204 of client device 102. For example, remote security module 212 may transmit one or more malware updates comprising malware signatures generated by automatic malware signature generator 214 to local security module 204. Remote security module 212 may transmit malware security data 210 on a periodic (e.g., daily or hourly) basis, in response to one or more newly generated malware signatures, and/or as requested by local security module 204.

Automatic malware signature generator 214 may include any combination of hardware, software, and/or firmware configured to automatically generate one or more malware signatures. The malware signatures may be used to identify malware residing on client device 102. Specific embodiments of automatic malware signature generator 214 will be described in more detail below.

Storage device 216 generally represents any type or form of storage device, such as the storage devices illustrated and described in connection with FIGS. 8 and 9. Storage device 216 may be configured to store byte sequence data 218 representative of one or more byte sequences that have been marked for possible inclusion in one or more malware signatures, malware signature data 220 representative of one or more malware signatures, malware data 222 representative of one or more malware programs, and/or any other type of data. Data 218, 220, and 222 may be arranged in one or more databases, look-up tables, and/or file structures as may serve a particular application. As will be described in more detail below, data 218, 220, and 222 may be generated, used, and/or modified by automatic malware signature generator 214 to generate one or more malware signatures.

As mentioned, it is desirable to generate malware signatures that each may be used to identify multiple malware files. In this manner, the number of malware signatures that have to be generated and provided by security computing subsystem 104 may be dramatically decreased.

However, malware signatures with too broad of malware coverage may result in false positives when used to identify malware. A false positive may occur when goodware is incorrectly identified as comprising malware. In some instances, a false positive may result when the particular malware signature used to identify malware comprises a byte sequence commonly included within both malware and goodware (e.g., a byte sequence that is representative of a library function or other library code). As used herein, the term "common code" will be used to refer to any code that may be common to both goodware and malware. Exemplary common code includes, but is not limited to, library code, byte sequences generated by compilers as prologs or postlogs of functions, code generated from publically available sample code, etc. Hence, it is desirable to prevent byte sequences representative of common code from being used as malware signatures in order to minimize the number of goodware programs that are incorrectly identified as malware using automatically generated malware signatures.

To this end, automatic malware signature generator 214 may be configured to determine whether a byte sequence marked for possible inclusion within one or more malware signatures has a likelihood of being representative of common code by analyzing a context diversity of the marked byte sequence. If it is determined that the byte sequence has a likelihood of being representative of common code, the byte sequence may be prevented from being included within one or more automatically generated malware signatures. As will be described in more detail below, the determination may be realized by determining a context diversity of the byte sequence within malware files each containing the byte sequence in accordance with one or more diversity-based heuristics.

In some instances, it is possible that automatic signature generator 214 may incorrectly determine that one or more byte sequences are representative of common code. This is acceptable in light of the desire to prevent any byte sequence that may potentially be associated with common code from being used as a malware signature. In this manner, the number of goodware programs that are incorrectly identified as malware using automatically generated malware signatures may be minimized.

Figure 3:
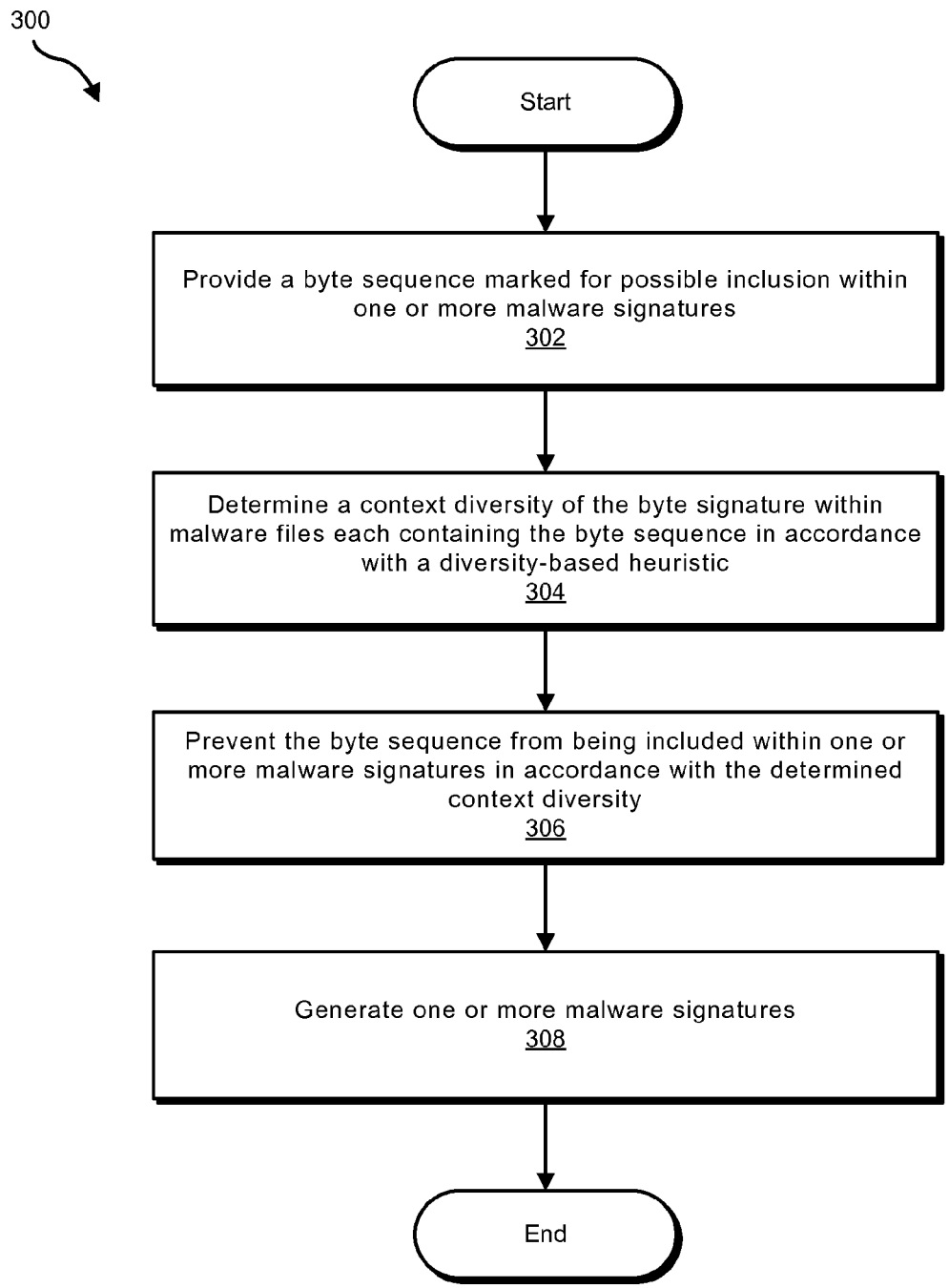
FIG. 3 is a flow diagram of an exemplary method for facilitating automatic malware signature generation.
Figure 4:
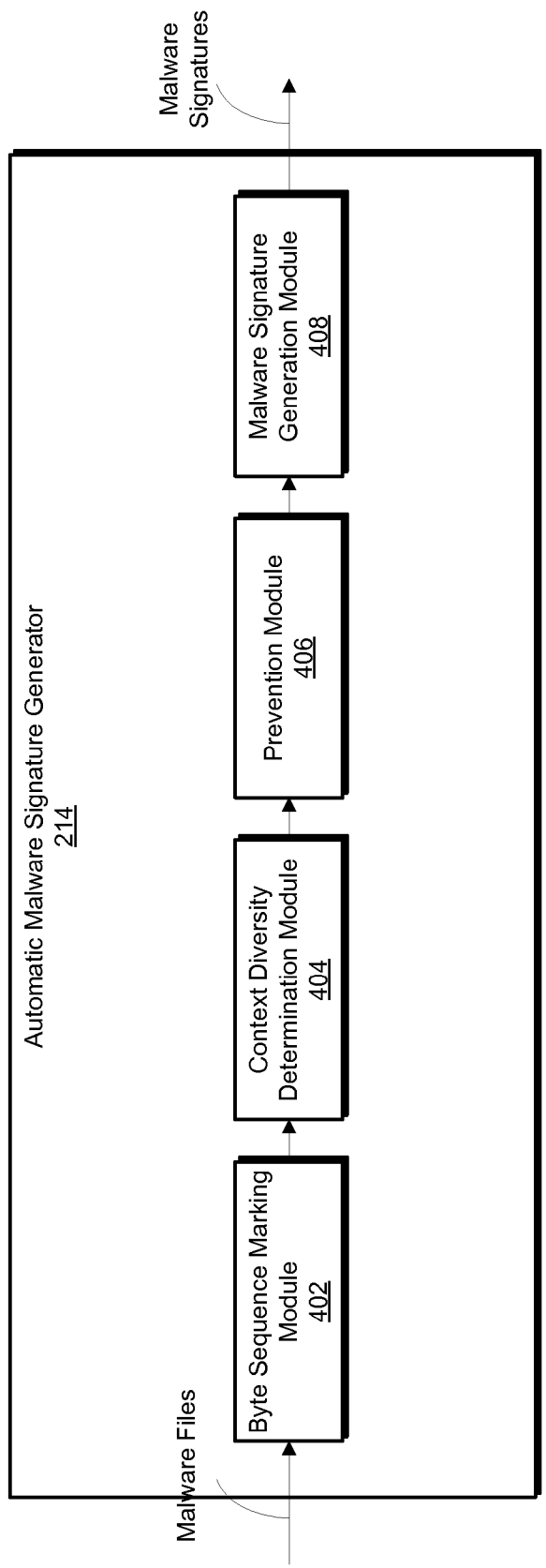
FIG. 4 is a block diagram of exemplary modules included within an automatic malware signature generator according to one embodiment.

FIG. 3 is a flow diagram of an exemplary method 300 for facilitating automatic malware signature generation. Each step shown in FIG. 3 may be performed by one or more components of security computing subsystem 104. For example, one or more steps shown in FIG. 3 may be performed by automatic malware signature generator 214. To this end, FIG. 4 shows that automatic malware signature generator 214 may include a byte sequence marking module 402, a context diversity determination module 404, a prevention module 406, and a malware signature generation module 408. One or more of these modules may be configured to perform one or more of the steps shown in FIG. 3.

In step 302, a byte sequence marked for possible inclusion within one or more malware signatures is provided. For example, byte sequence marking module 402 may be configured to analyze one or more malware files and mark a byte sequence contained within at least one of the malware files as being potentially representative of a malware signature. Hence, as used herein, the term "marked byte sequence" refers to a byte sequence that is potentially representative of a malware signature and that has been marked for possible inclusion within one or more automatically generated malware signatures.

Byte sequence marking module 402 may be configured to mark byte sequences for possible inclusion within one or more automatically generated malware signatures in any suitable manner and in accordance with any suitable marking heuristic. For example, byte sequence marking module 402 may be configured to mark a byte sequence for possible inclusion within one or more automatically generated malware signatures if the byte sequence does not match one or more library signatures corresponding to library functions associated with at least one compiler, is not associated with a function called by a known library function, is not located within a predetermined distance from an address space corresponding to at least one known library function, and/or does not access at least one global variable associated with a malware program.

In step 304, a context diversity of the marked byte sequence within malware files each containing the marked byte sequence is determined in accordance with one or more diversity-based heuristics. In some examples, the determining may be performed by context diversity determination module 404. Exemplary, but not exclusive, diversity-based heuristics that may be used by context diversity determination module 404 to determine a context diversity of the marked byte sequence within containing malware files will be described below.

In some examples, to facilitate determination of a context diversity of a marked byte sequence within containing malware files, context diversity determination module 404 may be configured to disassemble one or more malware files. In this manner, the individual bytes that comprise the one or more malware files may be analyzed. For example, context diversity determination module 404 may be configured to parse a binary image of the one or more malware files and transform it into assembly language or some equivalent representation. Any suitable disassembly algorithm or heuristic may be used by context diversity determination module 404 to disassemble the one or more malware files as may serve a particular application. It will be recognized, however, that in some embodiments the malware files do not have to be disassembled prior to being analyzed by context diversity determination module 404.

In step 306, a marked byte sequence may be prevented from being included within one or more malware signatures in accordance with the context diversity determined in step 304. For example, prevention module 406 may be configured to receive data indicative that the context diversity of the marked byte sequence is relatively too diverse (e.g., above a certain threshold), thus indicating that the marked byte sequence has a likelihood of being representative of common code. Prevention module 406 may then prevent the marked byte sequence from being included within malware signatures generated by automatic malware signature generator 214. Prevention module 406 may be configured to prevent marked byte sequences from being included within malware signatures generated by automatic malware signature generator 214 in any suitable manner as may serve a particular application.

In step 308, one or more malware signatures are generated. For example, malware signature generation module 408 may be configured to generate one or more malware signatures using one or more marked byte sequences that have been determined to be representative of non-common code. Malware signature data 220 and storage device 216 may be transformed in response to the generation of the malware signatures.

Returning to step 304, exemplary diversity-based heuristics that may be used by context diversity determination module 404 to determine a context diversity of a marked byte sequence within a plurality of containing malware files. It will be recognized that the diversity-based heuristics described herein are merely illustrative of the many different diversity-based heuristics that may be used by context diversity determination module 404.

A first exemplary diversity-based heuristic that may be used by context diversity determination module 404 to determine a context diversity of a marked byte sequence within a plurality of containing malware files includes grouping a plurality of malware files of which the containing malware files are a subset into a plurality of malware family clusters. Context diversity determination module 404 may then determine a total number of clusters that include at least one containing malware file. As will be described in more detail below, a marked byte sequence contained within malware files included within too many malware family clusters may have a relatively high context diversity level. The relatively high context diversity level may indicate that the marked byte sequence has a likelihood of being representative of common code and therefore should be prevented from being included within one or more automatically generated malware signatures.

Malware files may be grouped into a plurality of malware family clusters using any suitable clustering heuristic. For example, one-byte histograms, Rabin fingerprints, function call graph comparisons, and/or any other clustering heuristic may be used to group malware files into malware family clusters. Each malware family cluster includes a group of malware files that may be a part of a particular malware family. As used herein, a malware family includes a plurality of malware files that are related in any suitable manner. For example, malware files included within a malware family may be variations of one another. Such variations may be incorporated into the malware files by malware authors in an attempt to prevent detection of the malware files by anti-malware security programs.

In some examples, context diversity determination module 404 may be configured to group malware files into a plurality of malware family clusters by using a distance heuristic. For example, context diversity determination module 404 may be configured to determine that two malware files are related one to another by determining a distance between a set of characteristics of the first malware file and a set of characteristics of the second malware file. The distance between the two sets of characteristics may indicate how many of the characteristics from one set do not match characteristics from another set. For example, the sets of characteristics of the two malware files may include ten hashes representing ten sections of the malware files. If eight of the ten hashes of one malware file match the corresponding eight hashes of the other malware file, but the remaining two hashes of the first malware file do not match the corresponding two hashes of the second file, the distance between the two sets of characteristics may be equal to two. In this example, therefore, the smaller the distance between two malware files, the more related the two malware files are one to another.

In some examples, context diversity determination module 404 may be configured to determine whether the two malware files are related enough one to another to be included within the same malware family cluster by determining whether the distance between the two malware files is below a predetermined threshold. For example, if the predetermined threshold is equal to three, and the distance between the two files is equal to two, context diversity determination module 404 may determine that the two malware files should be included within the same malware family cluster. It will be recognized that any other suitable distance heuristic may be used to determine the degree of relationship between various malware files.

Figure 5:
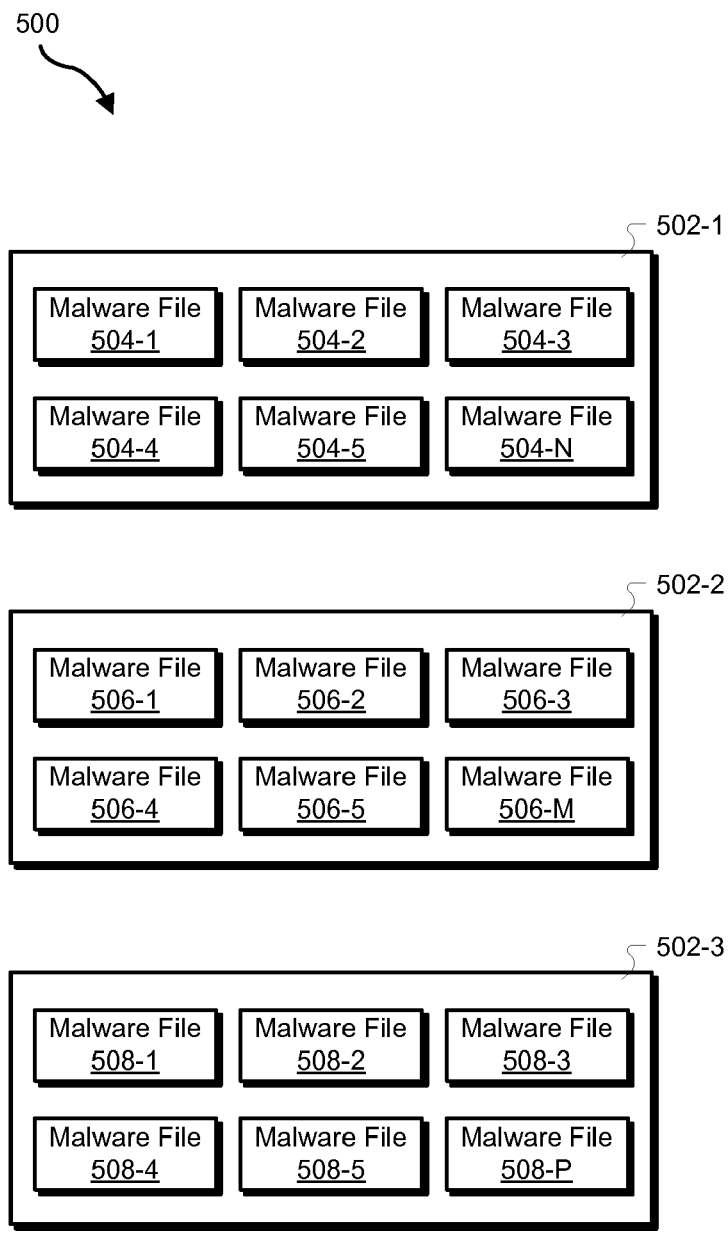
FIG. 5 illustrates an exemplary grouping of malware files into malware family clusters according to one embodiment.

FIG. 5 illustrates an exemplary grouping 500 of malware files into malware family clusters (e.g., malware family clusters 502-1 through 502-3, collectively referred to herein as "malware family clusters 502"). As shown in FIG. 5, each malware family cluster 502 may include a plurality of malware files. For example, malware family cluster 502-1 includes malware files 504-1 through 504-N, malware family cluster 502-2 includes malware files 506-1 through 506-M, and malware family cluster 502-3 includes malware files 508-1 through 508-P. Each malware file contained within a particular malware family cluster 502 is related one to another. It will be recognized that although three malware family clusters 502 are shown in FIG. 5, context diversity determination module 404 may be configured to group malware files into any number of malware family clusters as may serve a particular application.

In some examples, one or more containing malware files may be included within one or more of the malware family clusters 502. In other words, one or more malware files included within one or more of the malware family clusters 502 may contain a marked byte sequence generated by byte sequence marking module 402. In some examples, context diversity determination module 404 may be configured to determine a total number of the malware family clusters 502 that include at least one of the containing malware files. This determination may be performed in any suitable manner as may serve a particular application.

In some examples, prevention module 406 may be configured to prevent the marked byte sequence from being included within one or more automatically generated malware signatures if a total number of malware family clusters that include at least one of the containing malware files is greater than a predetermined threshold. This is because a marked byte sequence contained within malware files included within too many malware family clusters has a relatively high likelihood of being associated with common code, and therefore should be prevented from being included within one or more automatically generated malware signatures. The predetermined threshold to which the total number of malware family clusters that include at least one of the containing malware files is compared may be generated in any suitable manner.

To illustrate, with reference to FIG. 5, context diversity determination module 404 may determine that malware family cluster 502-1 includes one containing malware file, malware family cluster 502-2 includes one containing malware file, and that malware family cluster 502-3 does not include any containing malware files. Hence a total of two malware family clusters 502 include at least one malware containing file. If the predetermined threshold is equal to one, then prevention module 406 may be configured to prevent the marked byte sequence from being used in one or more automatically generated malware signatures.

However, if the total number of malware family clusters that include at least one containing malware is below the predetermined threshold, the marked byte sequence may be considered to be representative of non-common code, and may be included within one or more automatically generated malware signatures. For example, with reference to FIG. 5, if the predetermined threshold is equal to one, and malware family cluster 502-1 is the only malware family cluster that includes a containing malware file, the marked byte sequence may be considered to be representative of non-common code, and may be included within one or more automatically generated malware signatures.

In some alternative examples, prevention module 406 may be configured to prevent the marked byte sequence from being included within one or more automatically generated malware signatures if a ratio of the total number of malware family clusters that include at least one of the containing malware files to a total number of the containing malware files is greater than a predetermined threshold. This threshold may be determined any suitable manner as may serve a particular application and may be used to account for imperfections within the particular clustering algorithm used by context diversity determination module 404. If the ratio is greater than the predetermined threshold, prevention module 406 may be configured to prevent the marked byte sequence from being used in one or more automatically generated malware signatures.

An additional or alternative diversity-based heuristic that may be used by context diversity determination module 404 to determine a context diversity of a marked byte sequence within a plurality of containing malware files includes determining a byte offset of the marked byte sequence in each of the containing malware files. A standard deviation of the byte offset of the marked byte sequence in each of the containing files may then be determined and used to determine whether the marked byte sequence should be included within one or more malware signatures. As will be described in more detail below, a standard deviation of the byte offset that is above a certain threshold is indicative of a relatively high context diversity level for the marked byte sequence.

Figure 6:
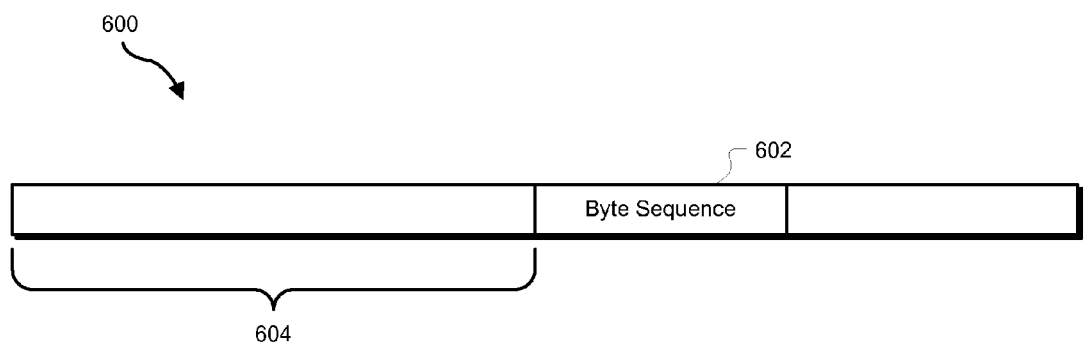
FIG. 6 shows a representation of an exemplary address space range that corresponds to a particular containing malware file according to one embodiment.

To illustrate, FIG. 6 shows a representation of an exemplary address space range 600 that corresponds to a particular containing malware file. As shown in FIG. 6, a marked byte sequence 602 may be offset a certain distance from a beginning point of the address space range 600. This byte offset is represented by reference number 604 in FIG. 6.

In some examples, the size of byte offset 604 may vary depending on the particular containing malware file. For example, marked byte sequence 602 may have a byte offset 604 equal to 105 bytes in a first containing malware file, 106 bytes in a second containing malware file, and 104 bytes in a third containing malware file.

If the standard deviation of the byte offset 604 is greater than a predetermined threshold, the code represented by the marked byte sequence is likely used for many purposes, which means that it is likely to be representative of common code. The predetermined threshold to which the standard deviation is compared may be generated in any suitable manner as may serve a particular application. Alternatively, if the standard deviation of the byte offset 604 is below the predetermined threshold, the marked byte sequence is likely to be representative of non-common code and may be included within one or more automatically generated malware signatures.

To illustrate, in the example given above where marked byte sequence 602 has a byte offset 604 equal to 105 bytes in a first containing malware file, 106 bytes in a second containing malware file, and 104 bytes in a third containing malware file, the average byte offset is 105 bytes and the standard deviation is 0.82. If the predetermined threshold to which the standard deviation is compared is 1.5, the marked byte sequence may be determined to be representative of non-common code and may be included within one or more automatically generated malware signatures.

In an alternative example, a marked byte sequence 602 may have a byte offset 604 equal to 100 bytes in a first containing malware file, 1000 bytes in a second containing malware file, and 5000 bytes in a third containing malware file. In this instance, the average byte offset is 2033 bytes and the standard deviation is 2130 bytes. If the predetermined threshold to which the standard deviation is compared is 1.5, the marked byte sequence may be determined to be representative of common code and may be prevented from being included within one or more automatically generated malware signatures.

In some examples, the byte offset of a marked byte sequence comprises an absolute byte offset. In other words, the byte offset is measured in terms of actual bytes that separate the marked byte sequence from a beginning address or some other reference address (e.g., a beginning address of a particular section of code) of a containing malware file. Alternatively, the byte offset may comprise a fractional positioned byte offset. In other words, a beginning address of the containing malware file may correspond to a 0 and an end address of the containing malware file may correspond to a 1, and the byte offset may include a fraction representative of a fractional position in between 0 and 1.

An additional or alternative diversity-based heuristic that may be used by context diversity determination module 404 to determine a context diversity of a marked byte sequence within a plurality of containing malware files includes determining whether a second marked byte sequence is located within each of one or more of the containing malware files. In some examples, the second marked byte sequence may be potentially or definitively representative of a known malware signature.

If it is determined that a second marked byte sequence is located within each of the one or more containing malware files, context diversity determination module 404 may determine a standard deviation of a distance between the marked byte sequence and the second marked byte sequence within each containing malware file. If a second marked byte sequence is not found within any of the containing malware files or if the standard deviation of the distance is greater than a predetermined threshold, it may be determined that the marked byte sequence has a relatively high context diversity level and that it should not be included within any automatically generated malware signatures.

Figure 7:
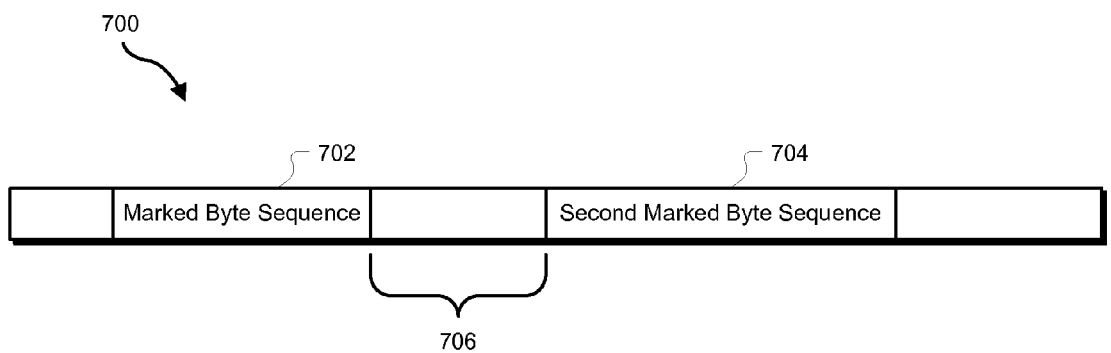
FIG. 7 shows an exemplary address space range corresponding to a malware file that includes multiple instances of a marked byte sequence according to one embodiment.

To illustrate, FIG. 7 shows an exemplary address space range 700 corresponding to a containing malware file. As shown in FIG. 7, a marked byte sequence 702 and a second marked byte sequence 704 are located within the containing malware file. As shown in FIG. 7, a distance 706 separates the two byte sequences 702 and 704. Distance 706 may be measured in bytes or any other suitable metric as may serve a particular application.

Once context diversity determination module 404 determines that a second marked byte sequence is located within each of the one or more containing malware files, a standard deviation of the distances may be determined. For example, if a distance between two byte sequences 702 and 704 within a first containing malware file is equal to 1000 bytes, within a second containing malware file is equal to 2500 bytes, and within a third containing malware file is equal to 4000 bytes, the average distance is 2500 and the standard deviation of the distances 1225.

In some examples, if a second marked byte sequence is not found within any of the containing malware files, or if the standard deviation of the distances is greater than a predetermined threshold, prevention module 406 may be configured to prevent the marked byte sequence from being included within one or more generated malware files. The predetermined threshold may be determined in any suitable manner as may serve a particular application.

However, if the standard deviation of the distances is less than a predetermined threshold, it may be determined that a segment of code shared among variants in a single malware family has been located. This is because the second marked byte sequence is found at generally the same offset in relation to the marked byte sequence in each of the containing files. Hence, it may be determined that the marked byte sequence has a likelihood of being representative of non-common code, and may be used or included within one or more automatically generated malware signatures.

In some examples, context diversity determination module 404 may be configured to require that the second marked byte sequence be offset a minimum threshold distance from the marked byte sequence in order to be used in this particular diversity-based heuristic. The minimum threshold distance may be equal to any suitable value, e.g., 1000 bytes. Moreover, the actual number of additional marked byte sequences included within each of the containing malware files as identified by context diversity determination module 404 may be equal to any number as may serve a particular application.

An additional or alternative diversity-based heuristic that may be used by context diversity determination module 404 includes determining a total number of distinct byte sequences (also referred to herein as "byte leaves") that surround the marked byte sequence in two or more of the containing malware files. If the total number of distinct byte sequences or byte leaves is greater than a predetermined threshold, it suggests that the marked byte sequence is used in the two or more containing malware files in many different ways, and therefore is more likely to be representative of common code. Hence, if the total number of distinct byte sequences is greater than a predetermined threshold, the marked byte sequence has a relatively high context diversity level and prevention module 406 may be configured to prevent the marked byte sequence from being included within the automatically generated malware signatures.

Prior to determining the total number of distinct byte sequences surrounding the marked byte sequence, the marked byte sequence may be expanded as much as possible by adding bytes to its beginning and end that are found in each of the two or more containing malware files. For example, a marked byte sequence may comprise 48 bytes. Context diversity determination module 404 may determine that each of the two or more containing malware files may include the same 10 bytes immediately preceding the marked byte sequence and the same 20 bytes immediately following the marked byte sequence. Hence, the marked byte sequence may be expanded to include all 78 contiguous bytes found in each of the two or more containing malware files prior to determining the total number of distinct byte sequences that surround the marked byte sequence. In this manner, bytes surrounding the marked byte sequence that are common to two or more containing malware files may not be included in the determination of the distinct byte sequences.

As detailed above, the context diversity of byte sequences marked for possible inclusion in one or more malware signatures within one or more containing malware files may be analyzed in accordance with one or more of the diversity-based heuristics described herein in order to prevent byte sequences having a likelihood of being representative of common code from being included within one or more malware signatures. By proceeding in this manner, the exemplary systems and methods described herein may reduce the number of byte sequences associated with common code used to generate malware signatures, and thereby minimize the number of goodware programs incorrectly identified as comprising malware.

Figure 8:
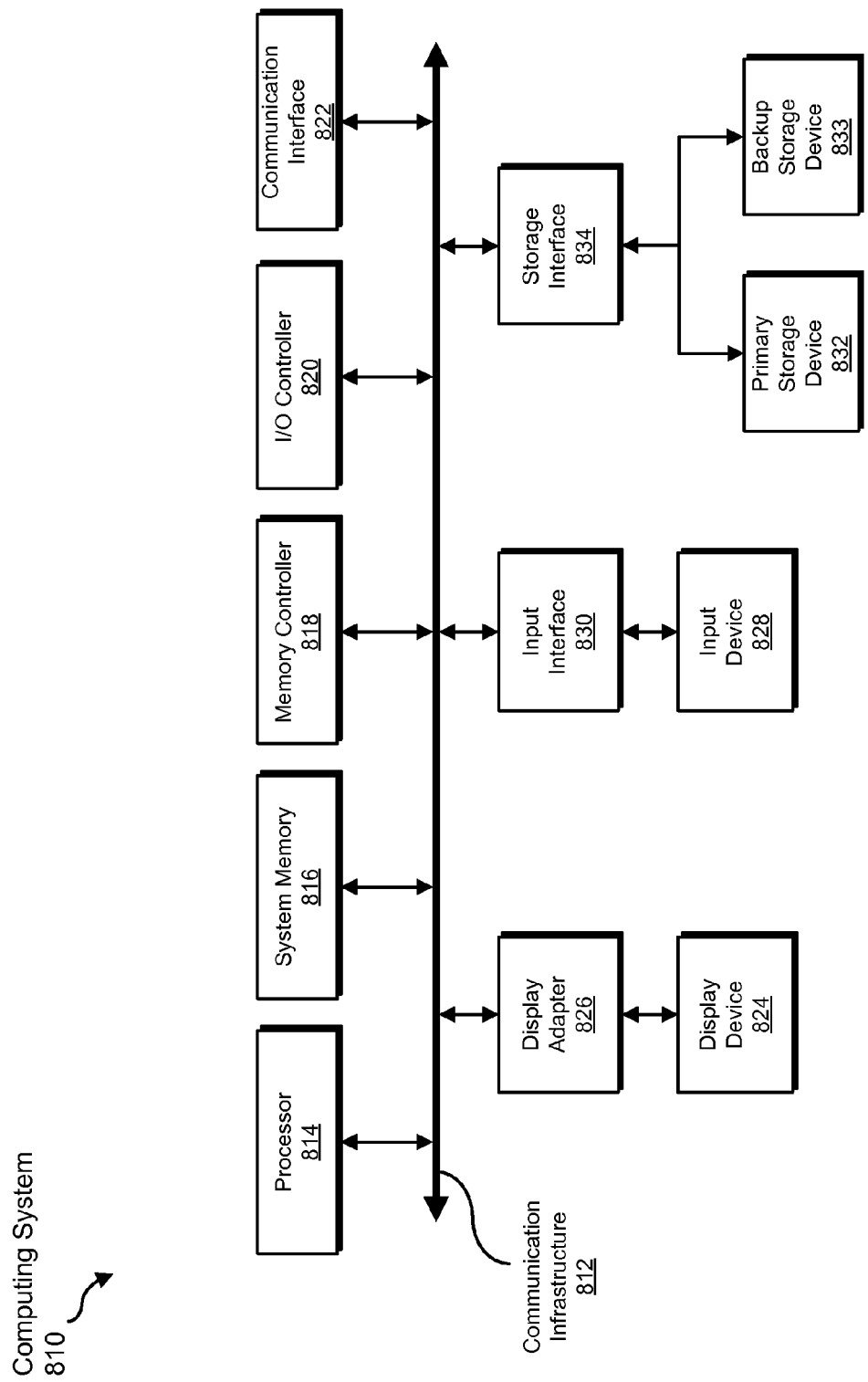
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the providing, determining, and preventing steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as providing, determining, and preventing.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the providing, determining, and preventing steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 894 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the providing, determining, and preventing steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the providing, determining, and preventing steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the providing, determining, and preventing steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
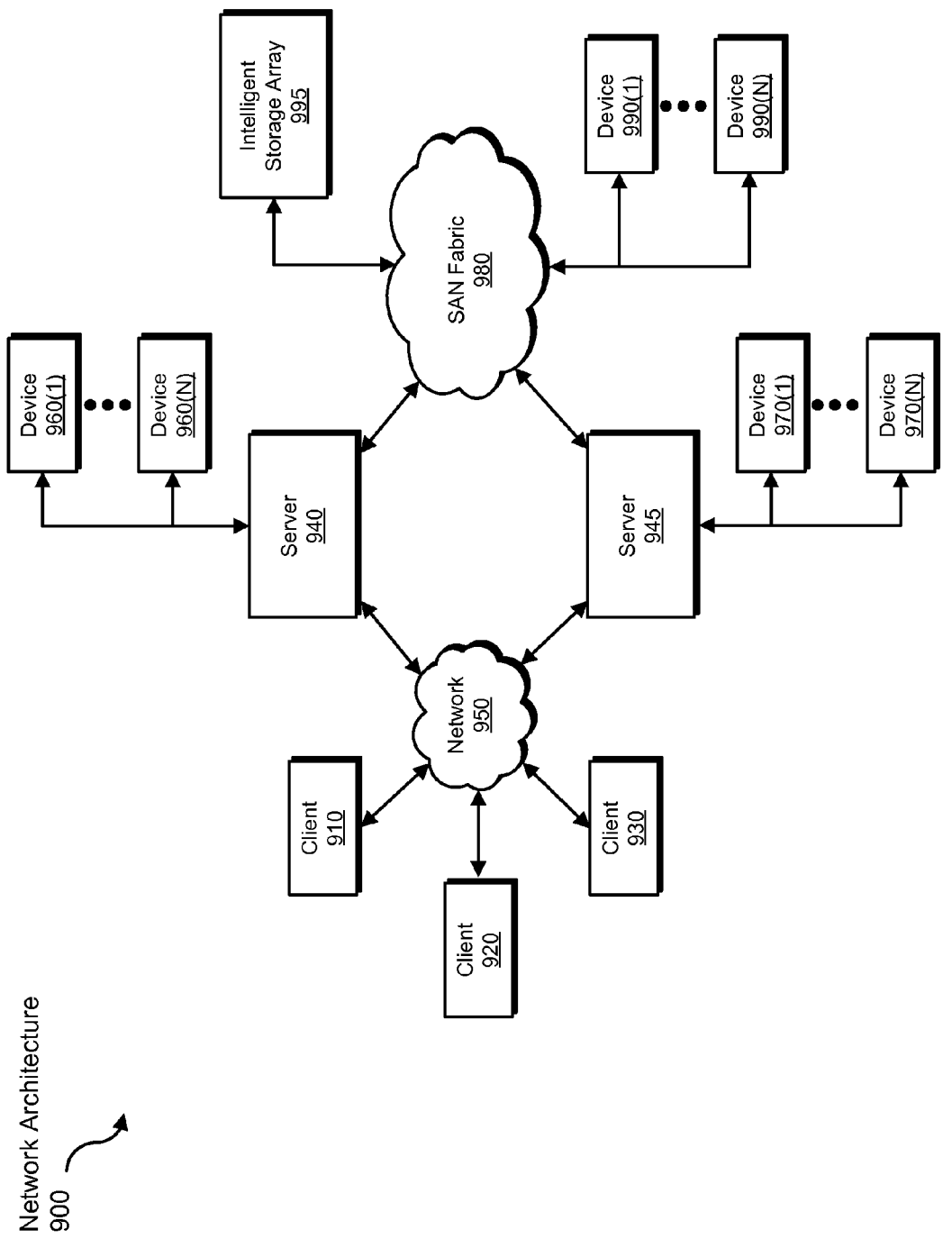
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for providing, determining, and preventing steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for facilitating automatic malware signature generation. In one example, a method for performing such a task may comprise: 1) providing a byte sequence marked for possible inclusion within one or more malware signatures, 2) determining a context diversity of the byte sequence within malware files each containing the byte sequence in accordance with a diversity-based heuristic, and 3) preventing the byte sequence from being included within the one or more malware signatures in accordance with the determined context diversity.

In some embodiments, the determining of the context diversity of the byte sequence within the containing malware files comprises grouping the plurality of malware files into a plurality of malware family clusters and determining a total number of the malware family clusters that include at least one of the containing malware files. The grouping may be performed in accordance with a distance heuristic and/or any other suitable heuristic. In these embodiments, the preventing may comprise preventing the byte sequence from being included within the one or more malware signatures if the total number of the malware family clusters that include at least one of the containing malware files is greater than a predetermined threshold. Alternatively, the preventing may comprise preventing the byte sequence from being included within the one or more malware signatures if a ratio of the total number of the malware family clusters that include at least one of the containing malware files to a total number of the containing malware files is greater than a predetermined threshold.

In some embodiments, the determining of the context diversity of the byte sequence within the containing malware files comprises determining a byte offset of the byte sequence in each of the containing malware files and determining a standard deviation of the byte offset of the byte sequence in each of the containing files. The byte offset may comprise at least one of an absolute byte offset and a fractional positional byte offset. In these embodiments, the preventing may comprise preventing the byte sequence from being included within the one or more malware signatures if the standard deviation is greater than a predetermined threshold.

In some embodiments, the determining of the context diversity of the byte sequence within the containing malware files comprises determining whether a second byte sequence associated with a malware signature is located within each of one or more of the containing malware files and determining a standard deviation of a distance between the byte sequence and the second byte sequence within each of the one or more containing malware files if the second byte sequence is located within each of one or more of the containing malware files. In these embodiments, the preventing may comprise preventing the byte sequence from being included within the one or more malware signatures if the standard deviation is greater than a predetermined threshold.

In some embodiments, the determining of the context diversity of the byte sequence within the containing malware files comprises determining a total number of distinct byte sequences surrounding the byte sequence in two or more of the containing malware files. In these embodiments, the preventing may comprise preventing the byte sequence from being included within the one or more malware signatures if the total number of distinct byte sequences is greater than a predetermined threshold.

In some embodiments, a system for facilitating automatic malware signature generation includes a byte sequence marking module configured to mark a byte sequence for possible inclusion within one or more malware signatures, a context diversity determination module communicatively coupled to the malware signature generation module and configured to determine a context diversity of the byte sequence within malware files each containing the byte sequence in accordance with a diversity-based heuristic, the containing malware files being a subset of a plurality of malware files, and a prevention module communicatively coupled to the context diversity determination module and configured to prevent the byte sequence from being included within the one or more malware signatures in accordance with the determined context diversity.

In some embodiments, a computer-readable-storage medium including instructions configured to direct a computer system to provide a byte sequence marked for possible inclusion within one or more malware signatures, determine a context diversity of the byte sequence within malware files each containing the byte sequence in accordance with a diversity-based heuristic, the containing malware files being a subset of a plurality of malware files, and prevent the byte sequence from being included within the one or more malware signatures in accordance with the determined context diversity.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context diversity of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable-storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating automatic malware signature generation, at least a portion of the method being performed by a computing system comprising at least one processor, the method comprising:
providing a byte sequence marked for possible inclusion within one or more malware signatures;
determining a context diversity of the byte sequence within malware files each containing the byte sequence in accordance with a diversity-based heuristic, the containing malware files being a subset of a plurality of malware files, the context diversity of the byte sequence identifying differences between the containing malware files such that a higher context diversity level of the byte sequence indicates that the byte sequence has a likelihood of being representative of a sequence found in goodware and a lower context diversity of the byte sequence has a likelihood of being representative of a sequence found in malware;
preventing the byte sequence from being included within the one or more malware signatures in accordance with the determined context diversity.

2. The method of claim 1, wherein the determining of the context diversity of the byte sequence within the containing malware files comprises:
grouping the plurality of malware files into a plurality of malware family clusters;
determining a total number of the malware family clusters that include at least one of the containing malware files.

3. The method of claim 2, wherein the preventing comprises preventing the byte sequence from being included within the one or more malware signatures if the total number of the malware family clusters that include at least one of the containing malware files is greater than a predetermined threshold.

4. The method of claim 2, wherein the preventing comprises preventing the byte sequence from being included within the one or more malware signatures if a ratio of the total number of the malware family clusters that include at least one of the containing malware files to a total number of the containing malware files is greater than a predetermined threshold.

5. The method of claim 1, wherein the context diversity of the byte sequence refers to where the byte sequence is located within the containing malware files.

6. The method of claim 1, wherein the determining of the context diversity of the byte sequence within the containing malware files comprises:
determining a byte offset of the byte sequence in each of the containing malware files;
determining a standard deviation of the byte offset of the byte sequence in each of the containing files.

7. The method of claim 6, wherein the preventing comprises preventing the byte sequence from being included within the one or more malware signatures if the standard deviation is greater than a predetermined threshold.

8. The method of claim 6, wherein the byte offset comprises at least one of an absolute byte offset and a fractional positional byte offset.

9. The method of claim 1, wherein the determining of the context diversity of the byte sequence within the containing malware files comprises:
determining whether a second byte sequence associated with a malware signature is located within each of one or more of the containing malware files;
determining a standard deviation of a distance between the byte sequence and the second byte sequence within each of the one or more containing malware files if the second byte sequence is located within each of one or more of the containing malware files.

10. The method of claim 9, wherein the preventing comprises preventing the byte sequence from being included within the one or more malware signatures if the standard deviation is greater than a predetermined threshold.

11. The method of claim 1, wherein the determining of the context diversity of the byte sequence within the containing malware files comprises:
determining a total number of distinct byte sequences surrounding the byte sequence in two or more of the containing malware files.

12. The method of claim 1, wherein the context diversity of the byte sequence refers to differences in how the byte sequence is used within the containing malware files.

13. A system for facilitating automatic malware signature generation, the system comprising:
a byte sequence marking module configured to mark a byte sequence for possible inclusion within one or more malware signatures;
a context diversity determination module communicatively coupled to a malware signature generation module and configured to determine a context diversity of the byte sequence within malware files each containing the byte sequence in accordance with a diversity-based heuristic, the containing malware files being a subset of a plurality of malware files, the context diversity of the byte sequence identifying differences between the containing malware files such that a higher context diversity level of the byte sequence indicates that the byte sequence has a likelihood of being representative of a sequence found in goodware and a lower context diversity of the byte sequence has a likelihood of being representative of a sequence found in malware;
a prevention module communicatively coupled to the context diversity determination module and configured to prevent the byte sequence from being included within the one or more malware signatures in accordance with the determined context diversity;
at least one hardware processor configured to execute the byte sequence marking module, the context diversity determination module, and the prevention module.

14. The system of claim 13, wherein the context diversity determination module is configured to determine the context diversity of the byte sequence within the containing malware files by:
grouping the plurality of malware files into a plurality of malware family clusters;
determining a total number of the malware family clusters that include at least one of the containing malware files.

15. The system of claim 14, wherein the prevention module is configured to prevent the byte sequence from being included within the one or more malware signatures if the total number of the malware family clusters that include at least one of the containing malware files is greater than a predetermined threshold.

16. The system of claim 13, wherein the context diversity determination module is configured to determine the context diversity of the byte sequence within the containing malware files by:
determining a byte offset of the byte sequence in each of the containing malware files;
determining a standard deviation of the byte offset of the byte sequence in each of the containing files.

17. The system of claim 13, wherein the context diversity determination module is configured to determine the context diversity of the byte sequence within the containing malware files by:
determining whether a second byte sequence associated with a malware signature is located within each of one or more of the containing malware files;
determining a standard deviation of a distance between the byte sequence and the second byte sequence within each of the one or more containing malware files if the second byte sequence is located within each of one or more of the containing malware files.

18. The system of claim 13, wherein the context diversity determination module is configured to determine the context diversity of the byte sequence within the containing malware files by:

determining a total number of distinct byte sequences surrounding the byte sequence in two or more of the containing malware files.

19. A non-transitory computer-readable-storage medium including instructions configured to direct a computing system to:

provide a byte sequence marked for possible inclusion within one or more malware signatures;

determine a context diversity of the byte sequence within malware files each containing the byte sequence in accordance with a diversity-based heuristic, the containing malware files being a subset of a plurality of malware files, the context diversity of the byte sequence identifying differences between the containing malware files such that a higher context diversity level of the byte sequence indicates that the byte sequence has a likelihood of being representative of a sequence found in goodware and a lower context diversity of the byte sequence has a likelihood of being representative of a sequence found in malware;

prevent the byte sequence from being included within the one or more malware signatures in accordance with the determined context diversity.

20. The non-transitory computer-readable-storage medium of claim 19, wherein the instructions are configured to direct the computing system to determine the context diversity of the byte sequence within the containing malware files by directing the computing system to:

group the plurality of malware files into a plurality of malware family clusters;

determine a total number of the malware family clusters that include at least one of the containing malware files.

* * * * *